United States Patent Office 3,389,077
Patented June 18, 1968

3,389,077
REGENERATING HYDROFINING CATALYST
William K. T. Gleim, Island Lake, and Mark J. O'Hara, Mount Prospect, Ill., assignors to Universal Oil Products Company, Des Plaines, Ill., a corporation of Delaware
No Drawing. Filed Dec. 6, 1965, Ser. No. 511,975
5 Claims. (Cl. 208—264)

ABSTRACT OF THE DISCLOSURE

Catalytic hydrorefining of asphaltene-containing heavy oil with intermittent catalyst regeneration. During the normal processing run, the reactor effluent is separated to provide a first cycle oil fraction having a 650° F.+IBP which is collected. When the catalyst becomes deactivated, the charge stock is cut out and the first fraction is passed through the catalyst bed, together with $H_2$, to hydrorefine the first fraction as well as to reactivate the catalyst. The thus hydrorefined first cycle oil fraction is separated to provide a second fraction having a 650° F.+IBP. When the normal processing run is resumed, the second fraction is then recycled to the reactor along with the charge stock.

---

The invention described herein relates to the hydrorefining of petroleum crude oils, and other heavy hydrocarbon fractions and/or distillates, for the primary purpose of greatly reducing the concentration of contaminating influences contained therein. More particularly, the present invention is directed toward an intermittent process for hydrorefining an asphaltene-containing hydrocarbon charge stock, which process involves intermittent catalyst reactivation through the utilization of a heavy cycle oil obtained from the hydrorefined charge stock.

Petroleum crude oils, topped or reduced crude oils, and other heavy hydrocarbon fractions and/or distillates including black oils, visbreaker effluent, tar sand oils, etc., contain various non-metallic and metallic impurities which detrimentally affect various processes to which such heavy hydrocarbon fractions may be subjected. Generally included among the non-metallic impurities are large quantities of nitrogen, sulfur and oxygen, usually found to exist in hetroatomic compounds. Nitrogen is undesirable because it effectively poisons various catalytic composites which may be employed in the conversion of these petroleum fractions. Nitrogenous and sulfurous compounds are further objectionable, since the combination of various fuels containing these impurities causes the the release of nitrogen oxides and sulfurous oxides which are noxious, corrosive, and present, therefore, a serious problem with respect to pollution of the atmosphere.

In addition to the foregoing described contaminating influences, petroleum crude oils and other heavy carbonaceous material contain high molecular weight asphaltenic compounds. These are non-distillable, oil-insoluble coke precursors which contain sulfur, nitrogen, oxygen and a variety of metals. They are generally colloidally dispersed within the crude oil, vacuum or tower bottoms product, and, when subjected to various reactions at elevated temperature, have the tendency to polymerize, thereby making conversion to more valuable soluble hydrocarbons extremely difficult. Thus, in the heavy bottoms product from a reduced crude vacuum distillation column, the polymerized asphaltenes exist as solid material even at ambient temperatures; this type of product is probably useful only as road asphalt or as a low-grade fuel when cut back, or diluted with middle-distillate hydrocarbons such as kerosene, light gas oil, etc.

Of the metallic contaminants, those containing nickel and vanadium are found to be most common, and generally occur in the form of thermally stable organo-metallic complexes, such as metallic porphyrins and the various derivatives thereof. A considerable quantity of the organo-metallic complexes are linked with asphaltenes and become concentrated in a residual fraction; some of the organo-metallic complexes are volatile, oil-soluble and are, therefore, carried over into lighter distillate fractions. A reduction in the concentration of the organo-metallic complexes is not easily achieved, and to the extent that the crude oil, or other heavy hydrocarbon charge stock becomes suitable for further processing. With respect to the hydrogenation, hydrorefining and/or hydrocracking of topped or reduced crude oils, atmospheric tower bottoms product and/or vacuum tower bottoms product, containing excessive quantities of asphaltenic compounds, some of which may be linked with the organo-metallic complexes, the primary difficulty resides in carbon formation due to the asphaltenic compounds, such carbon formation being favored as a result of the insolubility of these asphaltenic compounds. This gummy carbonaceous deposit causes the binding together of the catalyst particles, thereby restricting the flow of reactants through the catalyst bed.

The desirability of removing the foregoing described contaminating influences is well-known within the art of petroleum refining, and, heretofore, two principal approaches have been advanced: liquid phase hydrogenation and vapor phase hydrocracking. In the former type of process, the oil is passed upwardly in liquid phase and in admixture with hydrogen through a fixed bed, or slurry of sub-divided catalyst. Although perhaps effective in removing oil-soluble, organo-metallic complexes, such a process is relatively ineffective with respect to the oil-insoluble asphaltenes which are colloidally dispersed within the charge stock. Since the hydrogenation zone is at an elevated temperature, the retention of these unconverted asphaltenes, suspended in a free liquid phase oil for an extended period of time, results in polymerization, causing conversion thereof to become substantially more difficult. On the other hand, vapor phase hydrocracking is carried out either with a fixed bed, or an expanded-bed system at temperatures substantially above about 950° F. While this technique obviates to some extent the drawbacks of liquid phase hydrogenation, it is not entirely well-suited to treating crude oil and heavy hydrocarbon fractions due to the production of coke and carbonaceous material with the result that the catalytic composite succumbs to relatively rapid deactivation; this requires a large capacity catalyst regeneration system in order to implement the process on a continuous basis. Since the rate of diffusion of the oil-insoluble asphaltenes is significantly lower than that of dissolved molecules of the same molecular size, a fixed-bed process in which the charge stock and hydrogen are passed in a downwardly direction has been thought to be highly impractical. Selective hydrorefining and/or hydrocracking of a wide-boiling range charge stock is not easily obtained, and excessive amounts of light gases are produced at the expense of more valuable normally liquid hydrocarbons. The deposition of excessive quantities of gummy carbonaceous material results in plugging of fixed catalyst beds, as well as restriction of the recirculation in fluidized catalyst beds.

The object of the present invention is to provide a process for hydrorefining an asphaltene-containing charge stock, such as a petroleum crude oil, atmospheric tower bottoms product, or vacuum tower bottoms, which process may be conducted on a continuous basis without incurring the detrimental effects otherwise experienced. As hereinafter indicated, this object is accomplished through the intermittent feeding of a selective solvent which effects the disolution of the asphaltenic material which has caused gummy carbonaceous deposits to form upon the catalyst disposed within the reaction zone. This selective solvent is a heavy cycle oil fraction resulting from the initial processing of the charge stock; such a cycle oil is capable of transferring hydrogen from itself to the asphaltenes, thereby converting the same to pentane-soluble hydrocarbon products, and furthermore is stable to thermal cracking at elevated temperatures up to about 425° C. The utilization of such a solvent permits the subsequent hydrorefining reactions to be effected at high severity conditions of operation, thereby effecting a significant degree of hydrocracking to increase the yield of lower-boiling hydrocarbon products, various selective fractions of which have significantly decreased nitrogen and sulfur concentrations.

Therefore, in a broad embodiment, the present invention relates to a process for hydrorefining an asphaltenic charge stock which process comprises the steps of: (a) reacting said charge stock and hydrogen in a reaction zone having disposed therein a hydrorefining catalyst; (b) separating the hydrorefined charge stock to provide a first cycle oil fraction having an initial boiling point above about 650° F.; (c) discontinuing the flow of said charge stock to said reaction zone, and recycling said first cycle oil fraction, in admixture with said hydrogen, to said reaction zone; (d) separating the hydrorefined first cycle oil fraction to provide a second fraction having an initial boiling point above about 650° F.; (e) discontinuing the flow of said first cycle oil fraction to said reaction zone; (f) reintroducing said charge stock, in admixture with said hydrogen, to said reaction zone; and (g) recycling said second fraction to combine with said charge stock and hydrogen.

The process described in the foregoing embodiment is further characterized in that the hydrorefining reaction zone is maintained at a temperature within the range of from about 300° C. to about 525° C., and preferably having an upper limit of about 500° C. During that period of the operation when the asphaltene-containing charge stock is being processed, the reaction zone temperature is generally within the range of from about 425° C. to about 500° C. When the flow of charge stock is discontinued, and the flow of the first cycle oil fraction to the reaction zone is begun, the temperature within the reaction zone is generally lower, and within the range of from about 300° C. to about 425° C. In both instances, the reaction zone is maintained under an imposed hydrogen pressure within the range of from about 1000 to about 5000 pounds per square inch, the rate of the charge stock to the reaction zone being greater than a weight hourly space velocity of 1.5. In present specification and the appended claims, the term, "weight hourly space velocity" is defined as the weight of hydrocarbon charge per hour per weight of catalyst disposed within the reaction zone. During that portion of the process when the second fraction is recycled to combine with said charge stock, the volumetric ratio of the second fraction to said charge stock is within the range of from about 1:4 to about 2:1.

From the foregoing emobdiment, and the characterizations thereof, it will be noted that the hydrorefining process of the present invention invloves the intermittent feeding of a previously hydrogenated cycle oil and added hydrogen at such time as the catalytic composite accumulates gummy carbonaceous deposits to the extent that the catalyst is no longer capable of functioning in the desired and necessary manner. An essential feature of the present invention resides in the character of the cycle oil, it being a hydrocarbon fraction having an initial boiling point of at least about 650° F., and having been derived from the hydrorefined charge stock. This cycle oil, herein referred to as the first cycle oil fraction is collected over that period of time during which the asphaltene-containing charge stock is being processed. When analyses on the remaining portion of the hydrorefined product effluent indicate that the catalytic composite has lost its propensity for effecting the removal of various contaminating influences, the flow of charge stock therethrough is discontinued, the first cycle oil fraction being substituted therefor. It is understood that the flow of hydrogen, being admixed with the original hydrocarbon charge stock in an amount of from about 5,000 to about 50,000 standard cubic feet per barrel, is not discontinued but is combined with the first cycle oil fraction during the processing thereof in the reaction zone. However, it is preferred to lower the operating temperature within the reaction zone to a level within the range of from about 300° C. to about 425° C. such that the cycle oil fraction will not be subjected to thermal cracking reactions, but at least a portion thereof will undergo catalytic hydrocracking. Under these conditions of operation, the hydrogenated first cycle oil fraction is capable of transferring hydrogen from itself to the asphaltenes, thereby converting the same into pentane-soluble hydrocarbons, which in turn are subject to catalytic hydrocracking to produce additional lower boiling hydrocarbon products.

The reaction zone produce effluent, resulting from the processing of the first cycle oil fraction is separated to provide a second fraction having an initial boiling point of at least about 650° F. At such time as the previously collected quantity of the first cycle oil fraction is exhausted, the original hydrocarbon charge stock is re-introduced to the reaction zone, in admixture with hydrogen, and the second cycle oil fraction is added thereto in amounts to result in a volumetric ratio, of said second cycle oil fraction to said charge stock, within the range of about 1:4 to about 2:1. In addition to effecting a substantial degree of reactivation of the catalytic composite, and to the extent that the effective catalyst life is extended considerably, another advantage resides in the fact that those hydrocarbons boiling above a temperature of about 650° F., whether originally present in the charge stock or appearing in the product effluent therefrom, are processed within the reaction zone in such a manner that a considerable portion thereof is effectively recycled to extinction. The remaining portion, some of which may be withdrawn from the process, as the collected quantity thereof increases beyond that which is required for reactivation, is an exceptionally suitable heavy cycle oil charge stock for processing in a hydrocracking unit particularly designed to maximize the production of gasoline boiling range hydrocarbons.

Although a wide variety of hydrorefining catalysts may be utilized in effecting the process of the present invention, a particularly preferred composite is a 4-component catalyst comprising alumina, silica, molybdenum, and at least one metallic component from the iron-group of the Periodic Table. This catalytic composite may be specifically tailored to effect hydrorefining reactions while simultaneously being relatively immune to the deactivating influence of sulfurous compounds, and especially insensitive to nitrogenous compounds; also, while functioning at the relatively severe operating conditions hereinbefore set forth, the catalyst is capable of effecting a substantial degree of hydrocracking, notwithstanding the presence of nitrogenous compounds. With respect to the composite of alumina and silica, the alumina is present in an amount of from about 50% to about 80%, and at least as great as silica which is present in an amount of from about 20% to about 50%. The molybdenum component will be present in an amount of from about 13% to about 20%, calculated as the element and not as if existing in some combined form, based upon the weight of the alumina-silica composite. The iron-group component, iron, cobalt, and particularly nickel, is present in an amount less than the molybdenum, and within the range of from about 1.0% to about 6.0% by weight of the alumina-silica composite, and is also calculated as if existing as the element. This 4-component catalyst may be manufactured by any suitable means, a particularly convenient method utilizing impregnating techniques. The impregnating method of preparation involves initially forming an aqueous solution of water-soluble compounds of nickel and molybdenum, such as nickel nitrate, nickel chloride, ammonium molybdate, molybdic acid, etc. The alumina-silica carrier material particles are comingled with the aforementioned aqueous solution and subsequently dried at a temperature of about 250° F. The dry composite is thereafter subjected to high temperature calcination in an atmosphere of air at a temperature within the range of from about 600° F. to about 1700° F. The alumina-silica carrier material may be impregnated first with the molybdenum-containing solution, subsequently dried and calcined, and thereafter impregnated with the nickel-containing solution. On the other hand, the two solutions may be first commingled with each other, and the carrier material impregnated in a single step. The particular means which are utilized for the preparation of the catalyst is not considered to be a limitation upon the process of the present invention. Likewise, the molybdenum and nickel, after being composited with the alumina-silica carrier material, may be caused to exist therein in any desired form, and either as the element or as some compound thereof. Thus, the calcined composite may be further treated for the purpose of providing a catalyst in which the molybdenum and nickel exist as sulfides, oxides, sulfates, or in their most reduced state.

When the charge stock is a crude tower bottoms product or vacuum tower bottoms product as distinguished from the full boiling range crude oil, a particularly satisfactory catalyst comprises nickel and molybdenum composited with a carrier material consisting of 68% by weight of alumina, 10% by weight of silica, and 22% by weight of boron phosphate. Through the use of this carrier material, it is possible to lower the molybdenum concentration below a level of about 13.0% by weight, to about 6.0%. That is, a satisfactory hydrorefining catalyst comprises about 1.0% by weight of nickel and 8.0% by weight of molybdenum on the carrier material of alumina, silica, and boron phosphate.

The following example is given for the purpose of illustrating the means by which the process encompassed by the present invention is effected. The charge stock, temperature, pressure, catalyst, rates, etc., are herein presented as being exemplary only, and are not intended to limit the invention to an extent greater than that defined by the scope and spirit of the appended claims.

Example

The charge stock utilized to illustrate the process of the present invention was a topped Wyoming sour crude oil. The crude oil, having a gravity of about 23.2° API at 60° F., is contaminated by the presence of about 2.8% by weight of sulfur, 2700 p.p.m. of total nitrogen and 100 p.p.m. of combined nickel and vanadium (computed as elemental nickel and vanadium), and contains a high-boiling, pentane-insoluble asphaltenic fraction in an amount of about 8.39% by weight. This full boiling range crude was "topped," having about 5.0% by volume of light-ends removal, then having a gravity, ° API at 60° F., of 19.5, and containing 3.0% by weight of sulfur, 2900 p.p.m. of total nitrogen, 105 p.p.m. of nickel and vanadium, the pentane-insoluble asphaltenic fraction being about 8.5% by weight. The catalyst utilized in the hydrorefining reaction zone was a composite of 2.0% by weight of nickel and 16.0% by weight of molybdenum combined with 68% by weight of alumina, 10% by weight of silica and 22% by weight of boron phosphate.

The topped Wyoming sour crude was passed into the reaction zone, containing 100 grams of the above-described catalyst, in the form of spheres of 20–150 micron diameter, at a rate of 200 grams per hour (a weight hourly space velocity of 2.0). The inlet temperature to the catalyst bed was maintained at 790° F., the crude oil, in admixture with hydrogen in an amount of 50,000 s.c.f./bbl., being initially heated to that temperature. The pressure in the reaction zone was maintained at 3000 p.s.i.g.

These conditions were maintained for a test period of thirty-six (36) hours, during which time the total quantity of crude oil processed was 7,200 grams. At the end of this period, and after the reactor had been cooled and depressured, an analysis of the catalyst indicated that 1.03% of the crude oil charge had deposited on the catalyst as carbon. Further, the catalyst was virtually bonded together in a solid mass, no portion of which could be screened through 60-mesh. The liquid product from this 36-hour period indicated a substantial conversion of the charge stock to lower-boiling hydrocarbon products, in that the gravity, ° API @ 60° F., was about 33.1.

For the second portion of the test period, without changing conditions, the Wyoming sour crude was processed for eighteen hours to yield a total liquid product having a gravity, ° API @ 60° F., of about 32.9, the heavy cycle oil fraction of which had a gravity of 21.7° API @ 60° F. The flow of crude oil was cut off after 18 hours, and this cycle oil fraction charged to the reaction zone. After 9 hours of processing the cycle oil, the crude oil was re-introduced for another 18-hour period. This in turn was followed by a second 9-hour period in which only the cycle oil was processed. 7,200 grams of crude oil was processed during 36 hours, 3,600 grams of cycle oil during 18 hours, for a total liquid charge of 10,800 grams over the entire 54-hour period. The test for free-flowing catalyst showed that more than 91.0% passed 60-mesh; the catalyst analysis indicated 0.55% carbon on the catalyst, based upon the total liquid being processed.

In addition, the total liquid product, resulting from the crude oil, indicated a gravity of about 32.9° API @ 60° F. for the 36 hours, while the total liquid product from the cycle oil, stated above as having a gravity of about 21.7°, averaged about 27.5° API for the 18 hours. Thus, not only did the intermittent feeding of the cycle oil effect a substantial degree of catalyst reactivation, by causing the dissolution of the absorbed asphaltenes thereon, but the cycle oil further reacted to produce additional lower-boiling (less than 650° F.) hydrocarbons.

The foregoing example and specification are illustrative of the present invention, the method of effecting the same, and the benefits to be derived through the use thereof.

We claim as our invention:

1. A process for hydrorefining an asphaltenic hydrocarbon charge stock which comprises the steps of: (a) reacting said charge stock and hydrogen in a reaction zone having disposed therein a hydrorefining catalyst; (b) separating the hydrorefined charge stock to provide a first cycle oil fraction having an initial boiling point above about 650° F.; (c) when said catalyst becomes deactivated as a result of the asphaltenes in said charge stock discontinuing the flow of said charge stock to said reaction zone, and recycling said first cycle oil fraction, in admixture with said hydrogen, to said reaction zone and therein hydrorefining said first cycle oil fraction at a temperature below thermal cracking temperature while effecting concomitant reactivation of said catalyst; (d) separating the hydrorefined first cycle oil fraction to provide a second fraction having an initial boiling point above about 650° F.; (e) discontinuing the flow of said first cycle oil fraction to said reaction zone; (f) reintroducing said charge stock, in admixture with said hydrogen, to said reaction zone; and, (g) recycling said second fraction to combine with said charge stock and hydrogen.

2. The process of claim 1 further characterized in that said reaction zone is maintained at a temperature of from about 425° C. to about 525° C.

3. The process of claim 1 further characterized in that the temperature within said reaction zone, during the period when said first cycle oil fraction is passed therethrough, is within the range of from about 300° C. to about 425° C.

4. The process of claim 1 further characterized in that the rate of said charge stock through said reaction zone is greater than a weight hourly space velocity of 1.5.

5. The process of claim 1 further characterized in that the volumetric ratio of said second fraction, being recycled to combine with said charge stock, to said charge stock, within the range of from 1:4 to about 2:1.

References Cited
UNITED STATES PATENTS

| | | | |
|---|---|---|---|
| 2,608,521 | 8/1952 | Hoog | 208—254 |
| 2,697,683 | 12/1954 | Engel et al. | 208—216 |
| 2,723,946 | 11/1955 | Donaldson | 208—79 |
| 2,838,446 | 6/1958 | Donaldson | 252—411 |
| 2,944,098 | 7/1960 | Fogle et al. | 252—411 |
| 3,288,704 | 11/1966 | O'Hara et al. | 208—106 |

HERBERT LEVINE, *Primary Examiner.*

SAMUEL P. JONES, *Examiner.*